Figure 1:
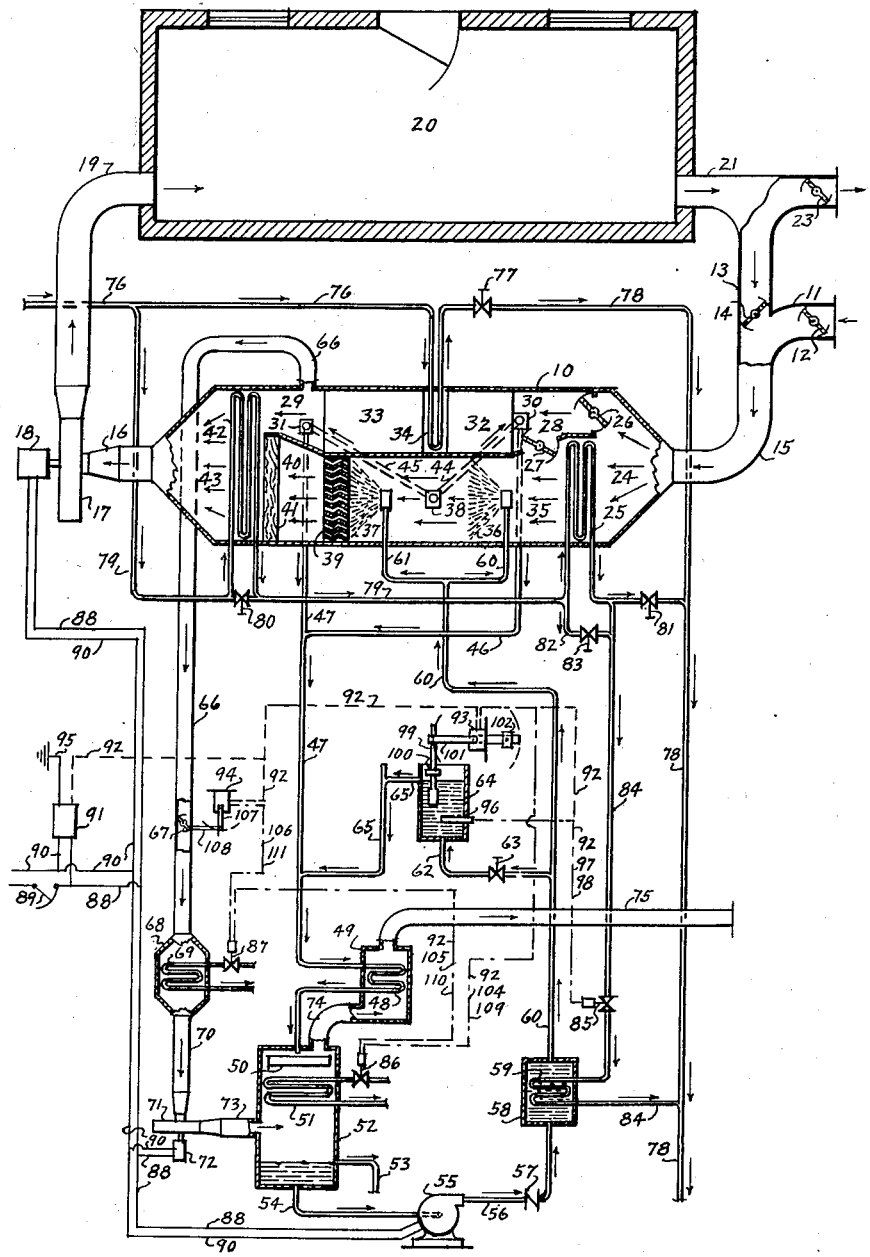

Patented May 2, 1939

2,156,293

UNITED STATES PATENT OFFICE 2,156,293

CONCENTRATOR FOR HYGROSCOPIC SOLUTIONS

Hiram Joseph Kaufman, Detroit, Mich.

Application November 9, 1935, Serial No. 49,020

2 Claims. (Cl. 159—44)

This invention relates to apparatus for reconditioning hygroscopic solutions by concentrating evaporation and particularly to the recovery of a comparatively cheap by-product, such as calcium chloride, for the dehumidification of air.

An object of the invention is to provide a means of recovering the major portion of the hygroscopic solution at temperatures within the range of ordinary heating systems, to economize in the amount of heating and cooling required, and to simplify the recovery apparatus.

Another object of the invention is to provide a means of utilizing a portion of the waste heat in the waste air to economize in the amount of heat supplied to the recovery apparatus.

A further object of the invention is to provide a means of controlling the temperature and specific gravity of the recovered solution to simplify the regulation of the dehumidification apparatus.

This application is a continuation in part of my prior application Serial No. 8,453, filed February 27, 1935.

Referring to the drawing:

The figure is a diagram showing the dehumidification apparatus and an enclosure to be dehumidified in plan, and hygroscopic solution recovery, cooling, and regulating apparatus in section.

The humidifying apparatus is indicated within the case 10 which is supplied with air, either from out of doors through the duct 11 controlled by the damper 12, or from the recirculated air duct 13 controlled by the damper 14, into the duct 15 into and through the case 10 and the duct 16 by the fan 17 which is driven by the motor 18, then forced by the fan 17 through the enclosure 20 and the duct 21, either out of doors through the duct 21 controlled by the damper 23, or into the recirculated air duct 13.

The case 10 contains the space 24, the pre-cooling coil 25, the regulating dampers 26 and 27, the spaces 28 and 29 with the drains 30 and 31, the spaces 32 and 33 holding hygroscopic material in particle form and in contact with a portion of the air stream, the cooling 34, the space 35 with the hygroscopic solution sprays 36 and 37, the drain 38, the spray eliminator 39, the space 40, the filter 41, the after-cooling coil 42, and the space 43.

The pre-cooling coil 25 controls the temperature of the air entering the space 35. The regulating dampers 26 and 27 open and close oppositely to alternately allow air to pass from the space 24 to the space 28, and from the space 24 to the space 35, thereby controlling the temperature of the air entering the particle dehydrator space 32. The cooling coil 34 controls the temperature of the air entering the particle dehydrator space 33. The after-cooling coil 42 controls the temperature of the air entering the space 43.

The spaces 32 and 33 holding hygroscopic material in particle form drain the partly dissolved hygroscopic material through the drains 30 and 31. The diluted hygroscopic solution from the sprays 36 and 37 drains through the pipes 44 and 45, over the drains 30 and 31 to dilute and to prevent the partly dissolved hygroscopic material from clogging the drains 30 and 31, then through the pipes 46 and 47 and the pipe 47 through the solution heating coil 48 of the heat exchanger 49, then into the distributing trough 50 and over the solution heating coil 51 of the solution evaporator 52, and through the pipe 54 to the recovered solution circulating pump 55. The surplus solution is drained through the overflow pipe 53.

The recovered hygroscopic solution is then pumped through the pipe 56, the check valve 57, the solution cooler 58, in contact with the cooling coil 59, through the pipe 60, the pipe 60 and 61, and to the sprays 36 and 37.

A small portion of the recovered and cooled solution is taken from the pipe 60 through the pipe 62, controlled by the valve 63 to maintain a smooth level within the regulating device 64 and corresponding to the height of the inlet to the overflow pipe 65. The overflow pipe 65 drains the waste solution from the regulating device 64 into the pipe 47 which conveys the diluted solution to the solution evaporator 52. The vertical end of the drain pipe 65 is extended above the normal level of the solution in the regulating device 64 and is open at the top to prevent the syphonage of solution from the regulating device 64 and to further assist in keeping the solution at a smooth level.

Extremely dry air is drawn from the space 29, through the duct 66, controlled by the damper 67, through the air heater 68, in contact with the heating coil 69, through the duct 70, into the fan 71, which is driven by the motor 72, then forced through the duct 73 into and upward through the solution evaporator 52, in contact with the solution heating coil 51, which is covered with the solution flowing from the distributing trough 50 downward over the said heating coil 51, then upward through the heat exchanger 49, in contact with and warming the dilute solution flowing in an opposite direction through the coil 48. The air is conducted from the solution evaporator 52 to the heat exchanger 49 by means of the duct 74 and has a temperature higher than that of the dilute solution flowing through the heating coil 48. The waste air containing moisture absorbed from the dilute solution is discharged out of doors through the duct 75.

Cooling water is supplied to the system through the pipe 76, through the cooling coil 34, controlled by the valve 77, and to the waste pipe 78, also through the pipe 79, through the after-cooling coil 42, controlled by the valve 80, through the pre-cooling coil 25, controlled by the valve 81 into the waste pipe 78, or through the pipe 82, controlled by the valve 83, into the pipe 84, thereby passing around the pre-cooling coil 25, and supplying the recovered solution cooling coil 59, controlled by the valve 85, and into the waste pipe 78 through the pipe 84.

Steam or hot water is supplied to the solution evaporating coil 51, controlled by the valve 86, and to the air heating coil 69, controlled by the valve 87.

Electricity is supplied to the system by the positive wire 88, controlled by the switch 89, and by the negative wire 90 to the fan motors 18 and 72, to the solution circulating pump motor 55, and to the transformer 91, from which low voltage current is supplied by the positive wire 92 to the motorized valves 85, 86, and 87, to the hygrometric regulating switch 93, and to the damper motor 94. The low voltage negative wire 95 is shown grounded.

The capacity of air to absorb moisture from other sources is dependent upon the temperature and upon the relative humidity, increasing with temperature and decreasing with relative humidity. Saturated air at 180 degrees temperature contains, approximately, fifteen times as much moisture as saturated air at 80 degrees temperature. Dehumidified air with a temperature of 80 degrees and a relative humidity of 30 per cent, when heated to 180 degrees temperature will have a relative humidity of, approximately, 2.0 per cent. The rate of evaporation of moisture from a solution is dependent upon the difference in vapor pressure between the moisture in solution with the dissolved solids, the concentration of which is noted by the specific gravity, and the boiling point of the solution, which is a function of temperature, and the vapor pressure of the air in contact therewith, which is a function of temperature and relative humidity. Moisture can be evaporated from a solution at a lower temperature if the vapor pressure of the air has been reduced by dehumidification.

The specific gravity of a solution is dependent upon the concentration of dissolved solids and the temperature, and can be measured by means of a hydrometer at some definite and predetermined temperature. The temperature of the flowing solution can be regulated by the amount of cooling water supplied to the recovered solution. The specific gravity of the recovered solution can be regulated by the amount of water evaporated from the dilute solution. A small portion of the recovered solution can be used for this purpose by passing it through a device for measuring and regulating the temperature and the specific gravity of the major portion of the solution, and then returning it to the dilute solution for reuse.

The temperature of the recovered solution is controlled by the thermostat 96, which on a rising temperature operates through the positive wire 92 and the negative wire 97 to open the motorized valve 85 increasing the amount of cooling water passing through the solution cooling coil 59, and on a lowering temperature operates through the positive wire 92 and the negative wire 98 to close the motorized valve 85 decreasing the amount of cooling water passing through the solution cooling coil 59.

The specific gravity of the recovered solution is controlled by the hydrometer 99, which slides up and down through the guide 100 and is attached near the upper end to the lever 101 which is balanced on the opposite end by the sliding counterweight 102, and which operates the switch 93 so that, on a rising of the specific gravity of the solution the hydrometer 99 is raised, also the lever 101, and causing the switch 93 to make contact through the positive wire 92 and the negative wire 104 to close the motorized valve 86, decreasing the amount of steam or hot water supplied to the solution heating coil 51, then through the positive wire 92 and the negative wire 105 to close the motorized valve 87, decreasing the amount of steam or hot water supplied to the air heating coil 69, then through the positive wire 92 and the negative wire 106 to close the damper 67 by means of the damper motor 94, the lever 107, and the rod 108, decreasing the amount of extremely dry air supplied to the recovery apparatus, and on a lowering of the specific gravity of the solution operates through the positive wire 92 and the negative wire 109 to open the motorized valve 86, increasing the amount of steam or hot water supplied to the solution heating coil 51, then through the positive wire 92 and the negative wire 110 to open the motorized valve 87, increasing the amount of steam or hot water supplied to the air heating coil 69, then through the positive wire 92 and the negative wire 111 to open the damper 67 by means of the damper motor 94, the lever 107, and the rod 108, increasing the amount of extremely dry air supplied to the recovery apparatus.

It will be understood that this invention is intended for the use of anhydrous calcium chloride, dihydrate calcium chloride, magnesium chloride, or other hygroscopic materials having similar properties, and that heating and cooling mediums, other than those mentioned can be used.

It will, also, be understood that minor changes can be made in the general arrangement and detail of the invention as shown and described in order to adapt it to commercial use, including changing the sequence of the steps for regulating the quantity of dry air, the temperature of the dry air, and the temperature of the solution during evaporation.

What I claim is:

1. Air conditioning apparatus, comprising a source of dilute hygroscopic solution, means for increasing the temperature of the dilute hygroscopic solution, a source of dehydrated air, means for contacting the dehydrated air with the dilute hygroscopic solution, means for increasing the temperature of the dehydrated air before contacting the dilute hygroscopic solution, means for indirectly utilizing a portion of the heat in the waste air and vapor for increasing the temperature of the dilute hygroscopic solution before contacting the dehydrated air, and means for controlling the specific gravity of the reconditioned hygroscopic solution by regulating the temperature of the dehydrated air before contacting the dilute hygroscopic solution.

2. Air conditioning apparatus, comprising a source of dilute hygroscopic solution, means for increasing the temperature of the dilute hygroscopic solution, a source of dehydrated air, means for contacting the dehydrated air with the dilute hygroscopic solution, means for increasing the temperature of the dehydrated air before contacting the dilute hygroscopic solution, means for indirectly utilizing a portion of the heat in the waste air and vapor for increasing the temperature of the dilute hygroscopic solution before contacting the dehydrated air, and means for controlling the specific gravity of the reconditioned hygroscopic solution by regulating the temperature of the hygroscopic solution in contact with the dehydrated air.

HIRAM JOSEPH KAUFMAN.